United States Patent
Cheriyan et al.

(10) Patent No.: US 9,933,827 B2
(45) Date of Patent: Apr. 3, 2018

(54) METHOD AND APPARATUS FOR HYBRID CHIP-LEVEL VOLTAGE SCALING

(71) Applicant: QUALCOMM Incorporated, San Diego, CA (US)

(72) Inventors: Ajay Cheriyan, San Diego, CA (US); Rajesh Joshi, Superior, CO (US); Madan Krishnappa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 750 days.

(21) Appl. No.: 13/771,064

(22) Filed: Feb. 19, 2013

(65) Prior Publication Data

US 2014/0232188 A1    Aug. 21, 2014

(51) Int. Cl.
*G06F 1/32* (2006.01)

(52) U.S. Cl.
CPC .......... *G06F 1/3206* (2013.01); *G06F 1/3296* (2013.01); *Y02B 60/1285* (2013.01); *Y10T 307/406* (2015.04)

(58) Field of Classification Search
CPC .............................. G06F 1/3206; G06F 1/3296
USPC .................................................. 713/300, 322
See application file for complete search history.

(56) References Cited

U.S. PATENT DOCUMENTS

| | | | |
|---|---|---|---|
| 7,707,434 B2 | 4/2010 | Kim et al. | |
| 7,752,365 B2 | 7/2010 | Taylor et al. | |
| 7,844,840 B2 | 11/2010 | McShane et al. | |
| 7,932,639 B2 | 4/2011 | Ma et al. | |
| 2005/0283630 A1* | 12/2005 | Shikata | 713/322 |
| 2006/0156045 A1* | 7/2006 | Galles | 713/300 |
| 2008/0162770 A1 | 7/2008 | Titiano et al. | |
| 2008/0301474 A1* | 12/2008 | Bussa et al. | 713/300 |
| 2009/0158060 A1 | 6/2009 | Vaajala | |
| 2009/0249089 A1 | 10/2009 | Tremel et al. | |
| 2009/0289615 A1* | 11/2009 | Foley | G06F 1/3203 323/318 |
| 2011/0055603 A1* | 3/2011 | Wolfe | G06F 1/206 713/320 |
| 2011/0276812 A1 | 11/2011 | Lee et al. | |
| 2012/0054511 A1 | 3/2012 | Brinks et al. | |
| 2015/0143143 A1 | 5/2015 | Park et al. | |
| 2015/0370296 A1 | 12/2015 | Purcell et al. | |
| 2017/0338661 A1 | 11/2017 | Marchya et al. | |

* cited by examiner

*Primary Examiner* — Daniel Kessie
*Assistant Examiner* — Thai Tran
(74) *Attorney, Agent, or Firm* — Loza & Loza, LLP/Qualcomm (57) ABSTRACT

Various aspects of a power management approach for a system-on-a-chip (SoC) is disclosed herein. In one aspect, the approach includes implementing a power profile for supplying power to a plurality of subsystems on a shared power bus in the SoC. The power profile includes at least one adjustable parameter for controlling the supplied power during an active use state. The approach further includes detecting a power profile change trigger; modifying the power profile based on the power profile change trigger; and adjusting the supplied power during the active use state based on the modified power profile to maintain a predetermined supplied power level.

25 Claims, 6 Drawing Sheets

METHOD AND APPARATUS FOR HYBRID CHIP-LEVEL VOLTAGE SCALING

BACKGROUND

Field

Aspects of the present disclosure relate generally to power control for system-on-a-chip integrated circuits, and more particularly, to a method and apparatus for hybrid chip-level voltage scaling.

Background

In a battery powered device, being able to reduce power consumption in order to extend battery life is of significant importance. One component that consumes a significant portion of the power budget, referred to as a system-on-a-chip (SoC), is an integrated circuit (IC) that combines many, if not all, functional subsystems of a computer or other electronic system into a single chip. For example, a SoC may include not only a processor, but also include memory (both volatile and non-volatile), interfaces (including those for peripherals, and networks), voltage regulators, timers, and any other application-specific circuits that may be integrated by design. These various subsystems may share a common power rail. The SoC is set to operate at specified voltages based on predetermined conditions. In other words, an operating voltage for the shared power rail is statically determined based on an aggregation of requirements for the various subsystems for each particular operating profile. A static mapping may thus be determined between each operating profile of the SoC and its required operating voltage and clock frequency. To reduce power consumption in typical SoC implementations, a SoC may be placed in a sleep mode—during which it consumes very little power. The SoC may also be placed in an idle mode, which is a mode of operation that allows the SoC to return into an active mode faster, but which consumes more power than the sleep mode.

While a lot of work has been done to reduce power consumption in idle or sleep modes, dynamically adjusting power consumption to meet performance and power targets when the system is being used has been relatively neglected. Because energy consumption is a product of power and time, with power being proportional to the square of the voltage, the ability to dynamically adjust an operating voltage level when the SoC is active is very desirable because an exponential reduction of energy consumption is possible based on a reduction of just the voltage component. Considering the fact that the device may be active for the entire duration that the battery is capable of powering the device, having this capability is even more desirable.

Further, due to manufacturing tolerances that result in differences in the manufactured chips, operating conditions for SoCs may fluctuate from chip to chip. Statically determined power profiles may not be optimized for these differences, but instead are forced to provide a safe voltage level for each power profile that may be applied to all SoCs for which these profiles are determined. Thus, the safe voltage level for a particular power profile must be as least as high as a minimal voltage level for a worst-case scenario that may be experienced by any device for which the particular power profile is designed. Otherwise, the SoC will not function properly or may even be damaged. As an extremely simplified example, assume that there are only two possible variations in manufacturing tolerances for a SoC that results in a first type of SoC needing a first voltage level to operate at a particular clock frequency, while a second type of SoC may require a second voltage level to operate at the same clock frequency. Assume further that the second voltage level is higher than the first voltage level. If the profile that is statically determined for both of these types of SoCs at the particular clock frequency are at the first voltage level, then all SoCs of the second type may fail to properly perform or even be damaged as they are not provided with a voltage level that is at least as high as the second voltage level. Although it has been proposed that profiles may be determined on a device-by-device basis, this approach would significantly reduce manufacturing throughput as well as increase design complexity for production.

Thus, it would be desirable to be able to address the issues identified above to be able to provide significant increased operating time for devices while not reducing performance significantly.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method for power management of a system-on-a-chip (SoC). The method includes implementing a power profile for supplying power to a plurality of subsystems on a shared power bus, wherein the power profile includes at least one adjustable parameter for controlling the supplied power during an active use state. The method further includes detecting a power profile change trigger; modifying the power profile based on the power profile change trigger; and adjusting the supplied power during the active use state based on the modified power profile to maintain a predetermined supplied power level.

Another aspect of the disclosure provides an apparatus for hybrid chip-level voltage scaling that includes means for implementing a power profile for supplying power to a plurality of subsystems on a shared power bus, wherein the power profile includes at least one adjustable parameter for controlling the supplied power during an active use state; means for detecting a power profile change trigger; means for modifying the power profile based on the power profile change trigger; and means for adjusting the supplied power during the active use state based on the modified power profile to maintain a predetermined supplied power level.

Yet another aspect of the disclosure provides a processor-readable storage medium including instructions stored thereon, which when executed by a processor, causes the processor to implement a power profile for supplying power to a plurality of subsystems on a shared power bus, wherein the power profile includes at least one adjustable parameter for controlling the supplied power during an active use state; detect a power profile change trigger; modify the power profile based on the power profile change trigger; and adjust the supplied power during the active use state based on the modified power profile to maintain a predetermined supplied power level.

Still yet another aspect of the disclosure provides an apparatus for hybrid chip-level voltage scaling that includes at least one processor; and a memory coupled to the at least one processor, wherein the memory is configured to cause the at least one processor to implement a power profile for supplying power to a plurality of subsystems on a shared power bus, wherein the power profile includes at least one adjustable parameter for controlling the supplied power during an active use state. The memory is also configured to cause the at least one processor to detect a power profile change trigger; modify the power profile based on the power profile change trigger; and adjust the supplied power during the active use state based on the modified power profile to maintain a predetermined supplied power level.

These and other aspects of the disclosed approach will become more fully understood upon a review of the detailed description, which follows.

BRIEF DESCRIPTION OF THE DRAWINGS

These and other sample aspects of the disclosure will be described in the detailed description that follow, and in the accompanying drawings.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of a hybrid chip-level power management approach for an SoC device may be implemented through a controller that dynamically manages power output of a power supply device using feedback from a hardware monitor. The SoC device may include a variety of subsystems that are coupled to a power supply rail to share the power output from the power supply. The hardware monitor is configured to monitor the operational characteristics of each of the subsystems, and request adjustment of the power output of the shared power supply device over the power supply rail in a dynamic approach, as further disclosed herein. In one aspect of the disclosed approach, the power management includes changing, or scaling a voltage level of the power supply rail in the SoC device.

Although certain specific examples of power consumption reduction using dynamic voltage scaling may be described herein, in general the various aspects of the disclosed approach seek to achieve reduced power consumption of the SoC device by not only being able to dynamically switch between different power profiles, but also being able to dynamically adjust a present power profile. Thus, in the description contained herein, each power profile, referred to as a "corner requirement", may include specific required operational parameters for the power supply. A switch from one corner requirement to another corner requirement, which is a change from one power profile to another power profile based on the operation of the power management approach described herein, may be referred to a "corner switch".

Further, even while the power supply is operating in accordance with a particular power profile, one or more dynamic adjustments may be made to any of the operational parameters for the power supply. For example, a dynamic adjustment to a particular power profile, which may be referred to herein as a "corner adjustment", may include a change in power levels within the power profile. As an even more specific example, the corner adjustment may be made to either increase or decrease a present power level to another power level. Thus, a corner switch to a particular power profile may mean that the power supply will initially provide power on the power rail at a first power level, but which may be changed by a corner adjustment to a second power level based on the power management approach described herein. Collectively, corner switches and adjustments may be referred to as a either "corner changes" or "power profile changes". These corner changes and power profile changes may be initiated based on one or more triggers, as described herein.

Figure 1:
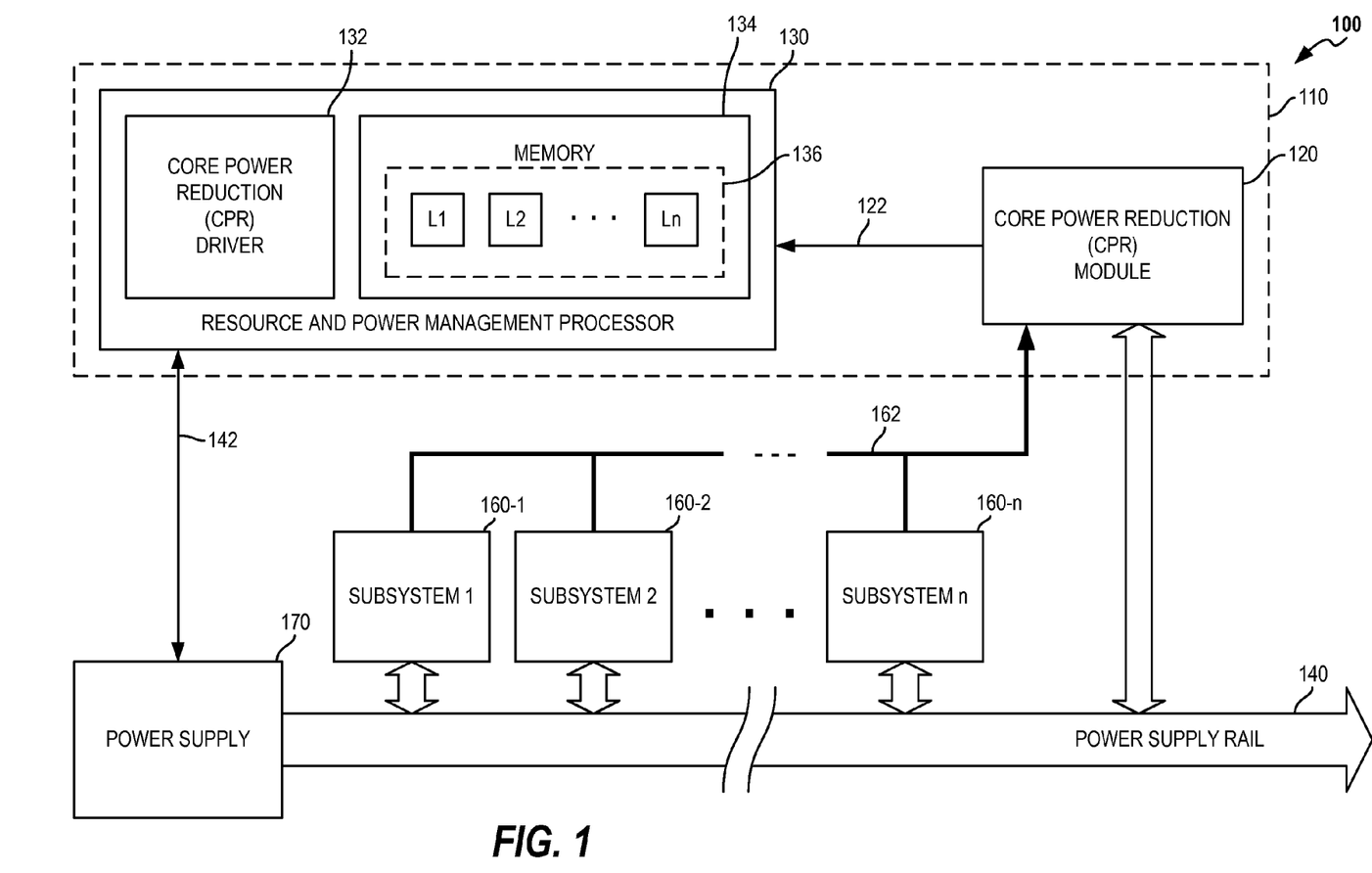
FIG. 1 is a block diagram illustrating an example of a system-on-a-chip (SoC) device configured in accordance with various aspects of the disclosed approach.

As illustrated in FIG. 1, a conceptualized block diagram of a SoC device 100 may be used to implement an approach to dynamically manage power output of a power supply 170 for a power rail 140 that is shared by a number of subsystems 160-1 to 160-n. In one aspect of the disclosed approach, the power supply 170 is a voltage controller that may provide voltages at different levels to the power rail 140. A hybrid power management system 110 manages the power supply 170 through a control channel 142. The hybrid power management system 110 includes a combination of a Core Power Reduction (CPR) module 120 that may be implemented in hardware as circuitry in the SoC device 100, and a CPR driver 132 that may be implemented as software executing on a Resource and Power Management (RPM) processor 130 that is coupled to the CPR module 120. The CPR software driver 132 may be executed on the RPM processor 130 and operates to control the power supply 170.

As an example, the SoC device 100 may be a system implementation for a mobile computing device that include a screen, a user interface such as keypad or touch interface for the screen, a communications transceiver such as a wireless modem, and one or more audio devices such as speakers/microphones. The number of subsystems 160-1 to 160-n may include subsystems configured to operate the display, the user interface, the communications transceiver, and the audio devices. As a specific example, a subsystem in the number of subsystems 160-1 to 160-n may be a display controller. As another specific example, another subsystem in the number of subsystems 160-1 to 160-n may be a sound controller. It should be apparent to those of ordinary skill in the art that any number of subsystems may be included in the number of subsystems 160-1 to 160-*n* as desired for a particular configuration of the SoC device 100. In other various aspects of the disclosed approach, any one of the number of subsystems 160-1 to 160-*n* may refer to one semiconductor device or a circuit of a plurality of semiconductor devices.

Figure 2:
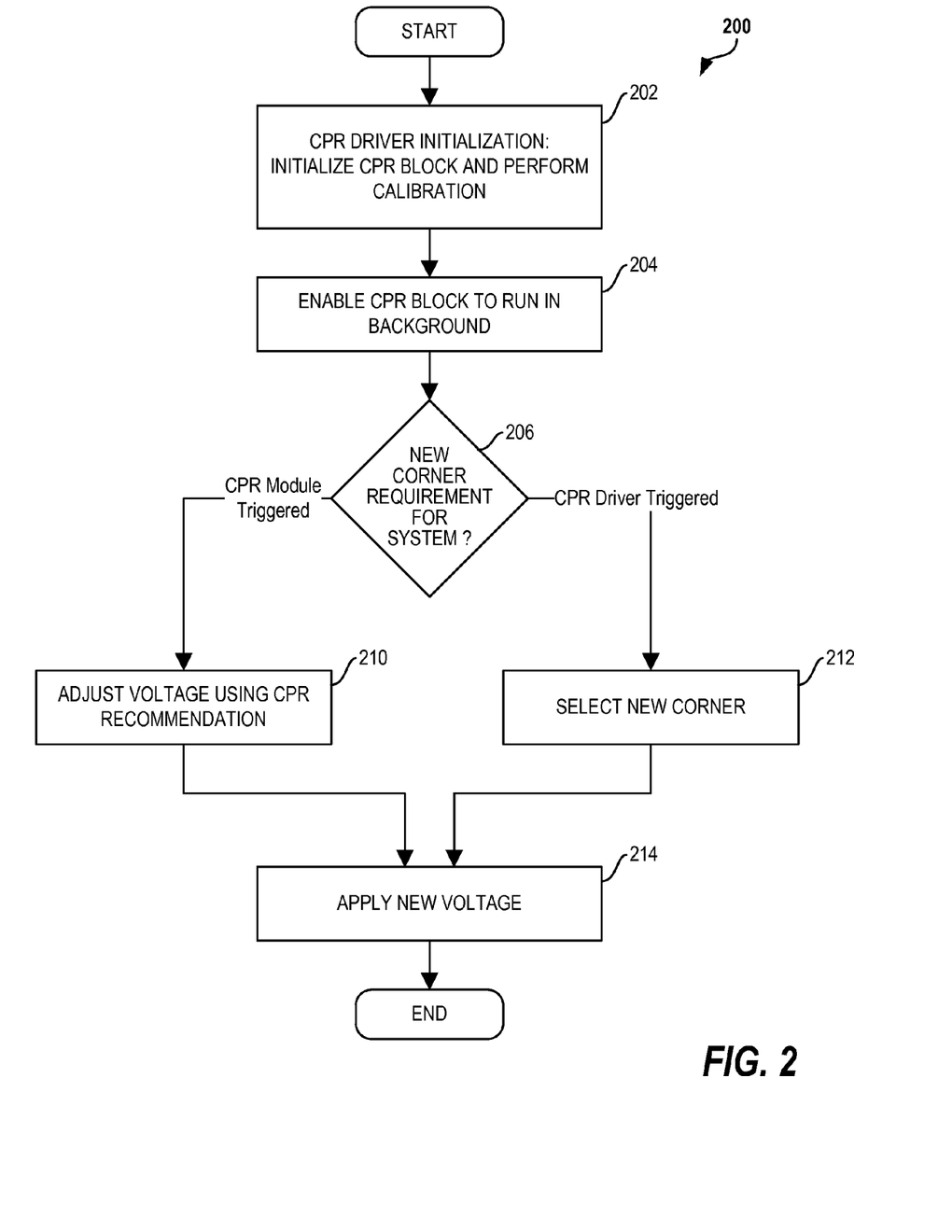
FIG. 2 is a flow diagram illustrating a process for dynamic power management for the SoC device of FIG. 1.

The operation of the hybrid power management system 110 in accordance with various aspects of the disclosed approach may be further clarified with reference to FIG. 2. For example, a dynamic power management process in one aspect of the disclosed approach may be implemented as two phases, an example of which is illustrated as a dynamic corner switching and adjustment process 200. The first phase is an initialization phase that calibrates a hybrid power management system in an SoC device such as the hybrid power management system 110 in the SoC device 100 for each performance level that may be employed by the SoC device 100 during an active, operational phase, as further described herein. Then, during a second operational or active phase, both corner adjustment and switching may dynamically occur as necessary to attempt to reduce overall power consumption while still providing various subsystems of the SoC device 100, such as the number of subsystems 160-1 to 160-*n*, with proper levels of power.

At 202, the hybrid power management system 110 is initialized. In one aspect of the disclosed approach, during this phase the CPR driver 132 may interact with the CPR module 120 to perform an initialization sequence that includes calibrating the CPR module 120. The CPR module 120 may also be configured to provide recommendations to the CPR driver 132 for adjustments of a particular power level if the CPR module 120 deems it necessary. As will be further detailed below, these recommendations may be provided in terms of programmable voltage resolutions or "steps" of voltage levels.

As part of the initialization sequence, the CPR driver 132 may calibrate the CPR module 120 with a particular baseline power profile for each performance level, which may be referred to as a design corner, where each design corner may specify parameters that are minimally necessary for the subsystems 160-1 to 160-*n* to operate at a required level. For example, each design corner may include an operation voltage level, referred to as a "safe" voltage level, at which components such as transistor devices in each of the subsystem 160-1 to 160-*n* are guaranteed to operate at an associated performance level. As those skilled in the art understand, all transistor devices require a voltage level commensurate with a particular desired switching speed. However, due to differences allowed by manufacturing tolerances, each transistor device may require a different voltage level to operate at the desired switching speed. Thus, where two transistor devices may be capable of operating at different speeds when supplied with the same voltage, the one transistor device that may operate at a higher speed may be referred to as a faster transistor, with the other being referred to as a slower transistor. If both transistor devices share a common power bus, it follows that the slower transistor will dictate a minimal voltage level that needs to be supplied to ensure both devices can operate as required at a particular performance level.

In one aspect of the disclosed approach, the CPR module 120 include sensors that may determine whether, because of process variations, devices are on a faster or slower side. The CPR module 120 may also determine any drops in voltage levels from a supply voltage experienced by each subsystem due to IR drops caused by path resistance between a voltage regulator module such as the power supply 170 and each integrated circuit component. In general, IR drops may be found at three sources in a microelectronic system: on-chip, package and board. For an SoC device such as the SoC device 100, properly addressing on-chip IR drops is especially critical in low-voltage, high-current designs.

The CPR module 120 may further detect any change in voltage levels in the power rail 140 due to temperature changes experienced by the SoC device 100. For example, the experienced temperature may be changed if the electronic device into which the SoC device 100 is integrated is moved into a different environment, such as going from the outdoors on a hot day to a cold, air-conditioned room). The experienced temperature may also be changed due to operation of the SoC device 100 itself, such as if the SoC device 100 is being used to run a particularly resource-intensive gaming application. In that case, the SoC device 100 may have to operate at a higher speed and thereby generate more heat—increasing overall system temperature.

In one aspect of the disclosed approach, based on an aggregated voltage level need that is considered across all the transistor devices in a subsystem, which may then be further aggregated over all the number of subsystems 160-1 to 160-*n* in the SoC device 100, a safe voltage level for each performance level may be determined and used as a starting point for a calibration of the hybrid power management system 110 for each power profile. The CPR module 120 may then adjust the voltage level for each performance level to determine a power profile that reflects a more accurate assessment of the voltage level requirement for that associated performance level. In various aspects of the disclosed approach, the adjustment may account for process, temperature, and other variations that may affect voltage level requirements of the SoC device 100. In another aspect of the disclosed approach, during calibration each performance level may simply be initialized to use a power profile based on an associated safe voltage level that has been predetermined during a design phase, which may then be modified as described herein during the operational phase.

For example, if there are three desired performance levels for the SoC device 100, with performance of the SoC device 100 expected to be scaled relative to each of the levels, then three different power profiles may be determined. In one aspect of the disclosed approach, the hybrid power management system 110 operates at multiple performance levels in an active-use case, where each performance level may have an associated power profile, as further described herein. As illustrated in FIG. 1, different power profiles may be stored as a set of power profiles L1 to Ln 136 in a memory 134 of the RPM processor 130, where n is a number of performance levels supported by the SoC device 100 (e.g., n=3 where there are 3 different levels).

In general, a goal during the first phase of the dynamic power switching and adjustment process 200 is for the hybrid power management system 110, including the CPR driver 132 along with the CPR module 120, to determine a safe active use-case voltage level for each power profile as associated with a performance level. These power profiles are enabled based on a specific performance level at which the SoC 100 is being operated. To determine a performance level at which to operate, in one aspect of the disclosed approach each subsystem in the number of subsystems 160-1 to 160-*n* may periodically indicate a desired performance level to the CPR module 120 using a communication bus generally illustrated as a signal line 162. The CPR module 120 aggregates these "votes" to determine a final performance level and then provides that as an input to the RPM processor 130. The RPM processor 130 may then choose a power profile from the set of power profiles L1 to Ln 136 stored in the memory 134 based on the CPR driver 132, and set the power supply 170 to use a baseline voltage for that performance level, as determined at 202.

At 204, after the initialization phase, the CPR module 120 is enabled to run in the background so that it may continuously determine if an adjustment to the present power profile may need to be recommended based on a present operating condition of the SoC device 100. In one aspect of the disclosed approach, if the CPR module 120 determines a need for an increase or decrease over the baseline voltage, the CPR module 120 may send an interrupt to the RPM processor 130 to request a voltage level change by generating an interrupt signal to the RPM processor 130 on an interrupt signal line 122. The CPR module 120 may also send a recommended amount of change along with the interrupt signal. The RPM processor 130 may then service the interrupt in a manner as determined by the CPR driver 132.

For various aspects of the disclosed approach, a change to a present power profile may occur as an adjustment to the power level of the present power profile. This adjustment, described previously as a corner adjustment, may include such adjustments as a voltage level adjustment based on an interrupt sent by the CPR module 120, for example. Another change to the present power profile may occur as a power profile change, which was described previously as a corner switch.

In one aspect of the disclosed approach, the CPR driver 132 is responsible for determining when to switch between different power profiles, or adjust the voltage provided by the power supply 170 based on the recommendation of the CPR module 120 from the interrupt received by the RPM processor 130. Thus, in one aspect of the disclosed approach, although the RPM processor 130 may receive a request to change the power level, the RPM processor 130 may decide not to adjust the present power profile. Because the RPM processor 130 may have more information as to the present and upcoming power needs of the SoC device 100, and because the RPM processor 130 may have a more complete picture of system-wide resource and power requirements, the RPM processor 130 may have ultimate control over whether there will be a corner adjustment or switch, or whether there will be any changes at all. In other words, the CPR hardware module 120 may be useful for recommending a desired active use case voltage level, but the CPR driver 132 may solely determine a voltage level that may be used. In another aspect of the disclosed approach, the RPM processor 130 may always be required to adjust the power profile if the request from the CPR module 120 is to increase the voltage level because the request most likely indicates that one or more subsystems is not receiving enough power.

At 206, where there is a determination that either a corner adjustment or switch needs to occur, in one aspect of the disclosed approach two possible results may occur. In a first possible scenario, where a corner adjustment is to occur, operation may continue at 210. In a second possible scenario, where a corner switch is to occur, operation may continue at 212.

At 210, where a corner adjustment may occur, the RPM processor 130 may adjust the power supply 170 to alter the present power profile by changing the present voltage level based on the recommendation of the CPR module 120. As discussed above, the CPR module 120 may send an interrupt signal to the RPM processor 130 and request a voltage level change. The RPM processor 130, when servicing the interrupt under the guidance by the CPR driver 132, may determine whether to modify the present voltage level using various aspects of the disclosed approach. If the present voltage level is to be modified, a modified voltage level may be determined and operation continues at 214.

At 212, when a corner switch may occur, the RPM processor 130 may select a new power profile from a current power profile by utilizing one of three power profile management approaches. In one aspect of the disclosed approach, a dynamic power profile management selection process 300, as illustrated and described with reference to FIG. 3, may be used to select which dynamic power profile management approach is used.

Figure 3:
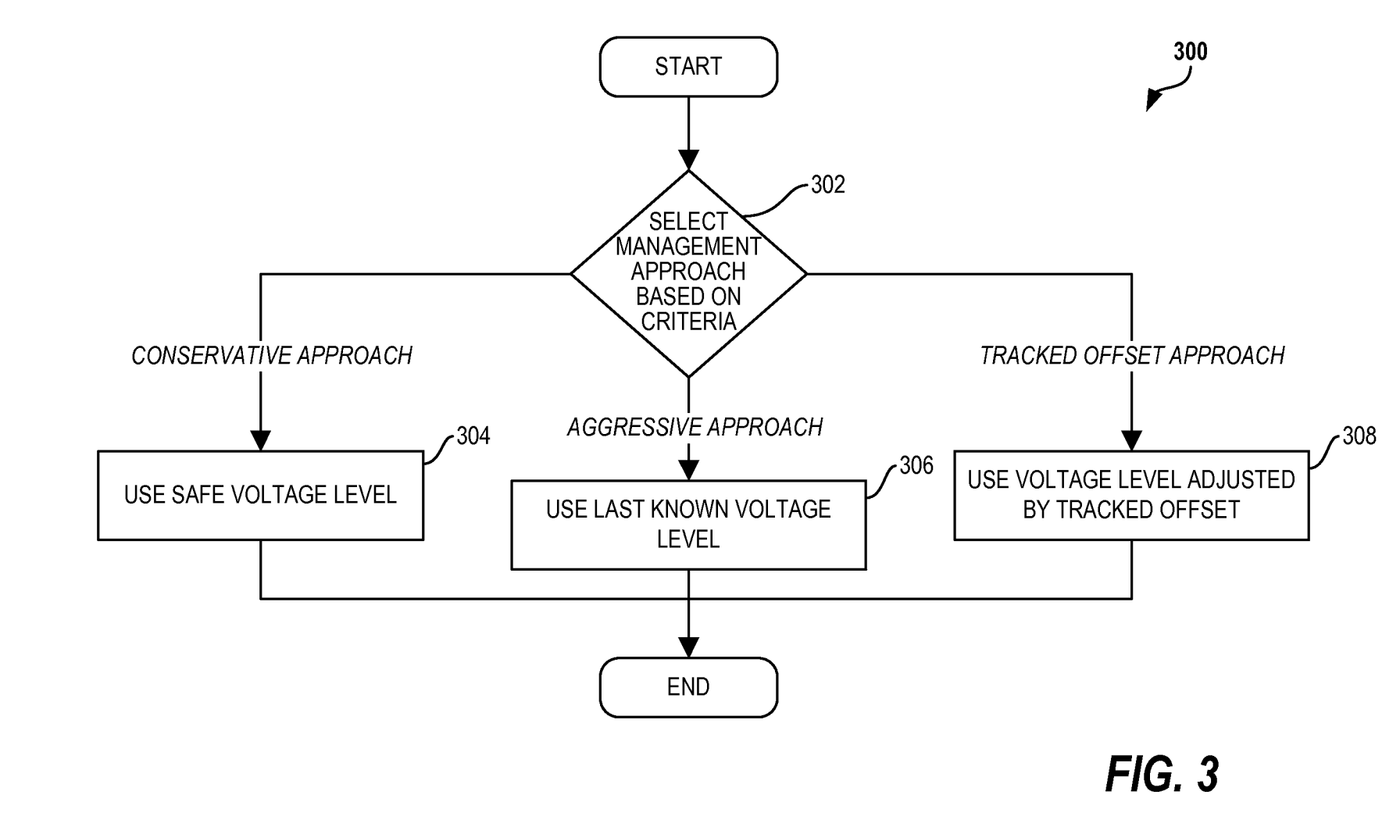
FIG. 3 is a flow diagram illustrating a process for dynamic power management selection for the SoC device of FIG. 1.

A 302, one or more power profile management approach selection criteria are examined to select one of three power profile management approaches. In one aspect of the disclosed approach, the criteria may include aggressiveness as to power conservation, state of the SoC device 100, or one or more characteristics of the number of subsystems 160-1 to 160-$n$ in the SoC device 100. The operation of the selection process for the dynamic power profile management approach may be better understood by better understanding of the three possible choices, as further described herein.

At 304, in one aspect of the disclosed approach, a conservative power profile management approach includes selecting a safe voltage level associated with the new power profile as the initial voltage to be supplied by the power supply 170, where the safe voltage level may be a voltage level as determined during the initialization portion at 202 of FIG. 2. As previously described, the safe voltage level may statically be available based on a design of the SoC device 100 and is typically the lowest possible voltage at which all variants of all subsystems of a SoC device such as the SoC device 100 may function at a specified corner. This initial voltage level may then be iteratively adjusted or refined to a new baseline voltage level for this power profile by the CPR driver 132 based on interrupts generated by the CPR module 120. Even assuming the safe voltage level is a minimal, safe voltage level, because the safe voltage level typically has to account for the worst case scenario of a SoC device being an overall slow device, this safe voltage level may still be higher than necessary for the number of subsystems 160-1 to 160-$n$ to operate correctly. Any difference between this necessary active use case voltage and the safe voltage level may be considered to result in power that will be wasted because the higher safe voltage level is not necessary. Thus, the resultant value of the baseline voltage level is typically lower than the safe voltage level.

As a power profile management approach, starting with the safe voltage level that is associated with the newly selected power profile may be a very conservative approach that may almost guarantee provision of proper voltages necessary for the operation of any SoC device. However, it may be noted that the resource requirements needed to then arrive at a baseline voltage for this approach may be higher than any other approach as there may almost always be at least one—and more likely multiple interrupts generated by the CPR module 120 to reduce the voltage. These interrupts have to be serviced by the RPM processor 130, which also has to service interrupts and process other resource requests from other subsystems. If the RPM processor 130 is under heavy use, high latency may be experienced for adjustments requested by the CPR module 120. As long as the voltage level is higher than necessary, subsystems sensitive to low voltage levels may still operate in this approach.

At 306, in one aspect of the disclosed approach, an aggressive power profile management approach includes selecting the last voltage level recommended by the CPR module 120 for the new power profile associated with the requested performance level as the initial voltage to be supplied by the power supply 170. The aggressive approach avoids having to rely on a safe voltage level when a recommended voltage level has previously been determined. The approach may avoid the hybrid power management system 110 having to make numerous adjustments from the safe voltage level associated with the new power profile. This reduces overhead on the RPM processor 130 compared to the conservative approach at 304 by not generating an interrupt unless absolutely necessary. The aggressive approach may be the most suitable for use in an environment where low latency is required. However, as this is an aggressive estimation of the voltage level that may be required by the number of subsystems 160-1 to 160-n, the resultant voltage level that is set may not be sufficient and this approach may not be suitable if there are devices that are highly sensitive to voltage levels.

At 308, in one aspect of the disclosed approach, a tracking power profile management approach includes tracking variations of the voltage level of the power profile associated with the current performance level as compared to the safe voltage for this performance level. An adjustment is then made to the safe voltage level of the power profile associated with the new performance level to provide the same variation from the safe voltage as the current power profile. This approach may be useful for subsystems that are extremely sensitive to voltage variation because the hybrid power management system 110 may have access to the most accurate voltage information.

At 214, the voltage level as determined in either 210 or 212 is applied by the RPM processor 130 setting the power supply 170 to output a new voltage level. As described, the voltage levels that are used may be stepped in levels. For example, a minimum step in a range of 5-15 mV may be used for modern microelectronic circuits that may require finer resolutions. In other aspects of the disclosed approach, different sized steps may be used that may be larger or smaller than the exemplary ranges provided herein, based on the types of devices for which the hybrid power management system 110 is used.

Dynamic selection of which power profile management approach to employ when performing a voltage switch may allow better customization of the various power management approaches described herein. For example, in a timeline-critical environment requiring low latency, the aggressive power profile management approach of 306 would be suitable. The conservative power profile management approach of 304 and the tracking power profile management approach of 308 would be suitable if voltage sensitive subsystems are awake. Dynamic switching between the three power profile management approaches may employed if the sensitive blocks are power collapsed.

The various aspects of the disclosed approach provided herein provides the hybrid power management system 110 ability to vary voltage requirements for the SoC device 100 based on feedback provided by the CPR module 120. The feedback may be generated using data from sensors that track temperature and process variation during operation of the SoC device 100, and provide for dynamic power management. Dynamic power management may offer several benefits, not all of which are limited to the operation of the SoC device 100. For example, during production, devices such as the SoC device 100 may no longer have to be characterized based on speed characteristics of the silicon. Based on design corners, the CPR module 120 and the CPR driver 132 are capable of adjusting a system voltage after sensing whether the silicon is on a slower or faster side.

In addition, software design for new SoC devices such as the SoC device 100 may also be simplified. Unlike previous chipsets—where software had to be recompiled with the higher operating voltages for faster parts—the same software package may be run on all types of silicon once the software package is configured with information of the design corners for a chipset. Further, because the ratio of active time to inactive time is often greater than one (1) in normal mobile device usage scenarios, reducing power consumption in active use cases may bring significant improvements to battery life.

In one aspect of the disclosed approach, the RPM processor allows clients to vote or request an operating condition specified by the SoC design, referred to herein as a "corner". The idea of a voltage being associated with a corner is abstracted from the clients. For example, the various clients would be the various subsystems who share the voltage rail. In this scenario, a client will notify the RPM of its new corner requirement. RPM then obtains the "safe" voltages corresponding to the new corner requirement. This may statically be available based on a design of the SoC device 100. As previously described, the safe voltage is typically the lowest possible voltage at which all variants of all subsystems of an SoC device, such as the SoC device 100, may function at a specified corner. The safe voltage is then refined by the CPR driver 132 using recommendations from the CPR module 120. This recommendation is typically to reduce the voltage level value from the safe voltage level as the safe voltage level accounts for the worst case scenario of the SoC being a "slow" device. The new baseline voltage level is then applied to the power supply 170. Thus, the CPR driver 132, which is capable of dynamically adjusting the voltage associated with the requested corner based on the recommendation provided by the CPR module 120, may determine a new voltage based on the recommendation sent by the CPR module 120

Figure 4:
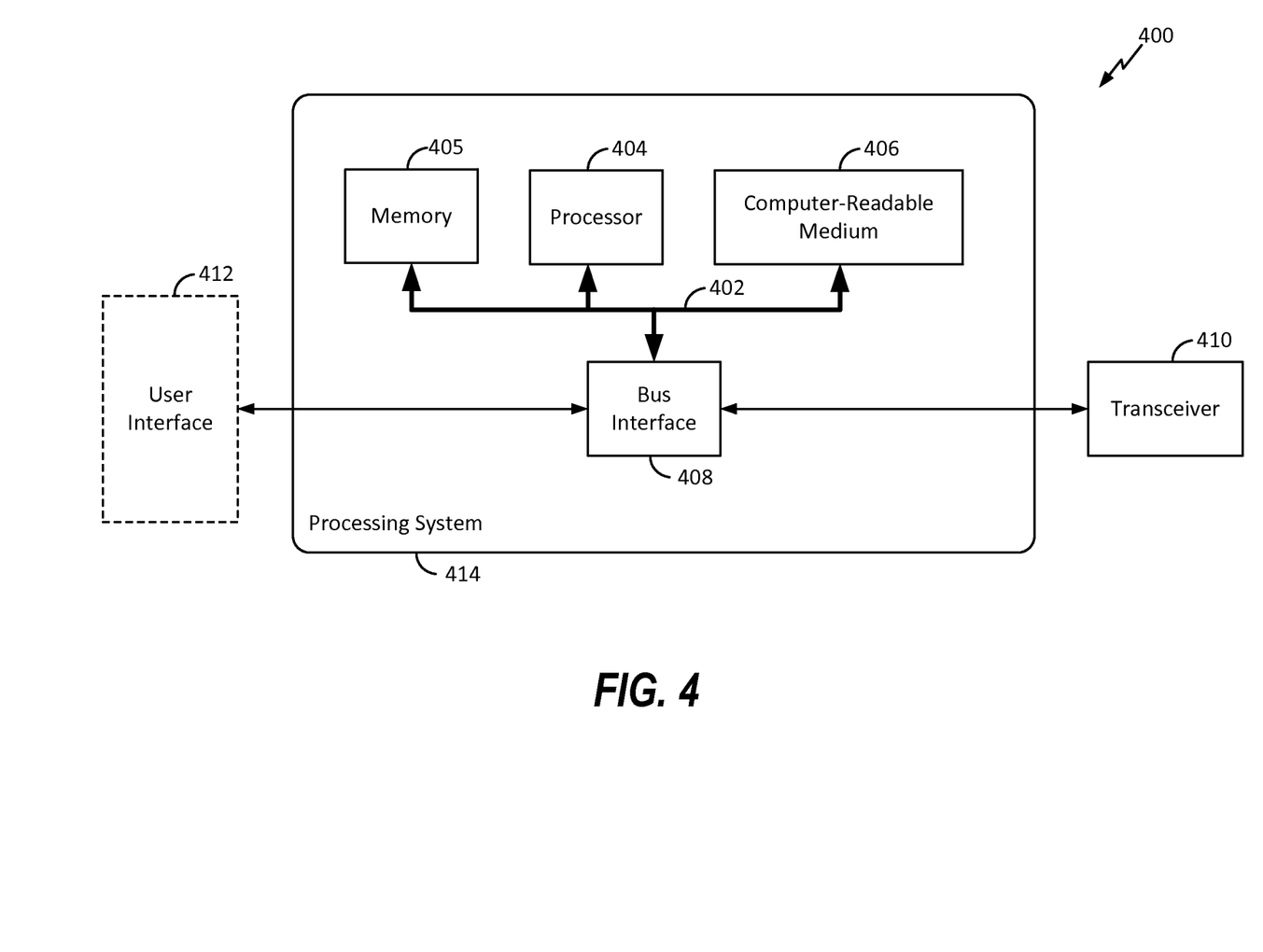
FIG. 4 is a block diagram illustrating an example of a hardware implementation for an apparatus employing a processing system.

FIG. 4 is a conceptual diagram illustrating an example of a hardware implementation for an apparatus 400 employing a processing system 414 that may be implemented using an SoC device such as the SoC device 100. In accordance with various aspects of the disclosure, an element, or any portion of an element, or any combination of elements may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
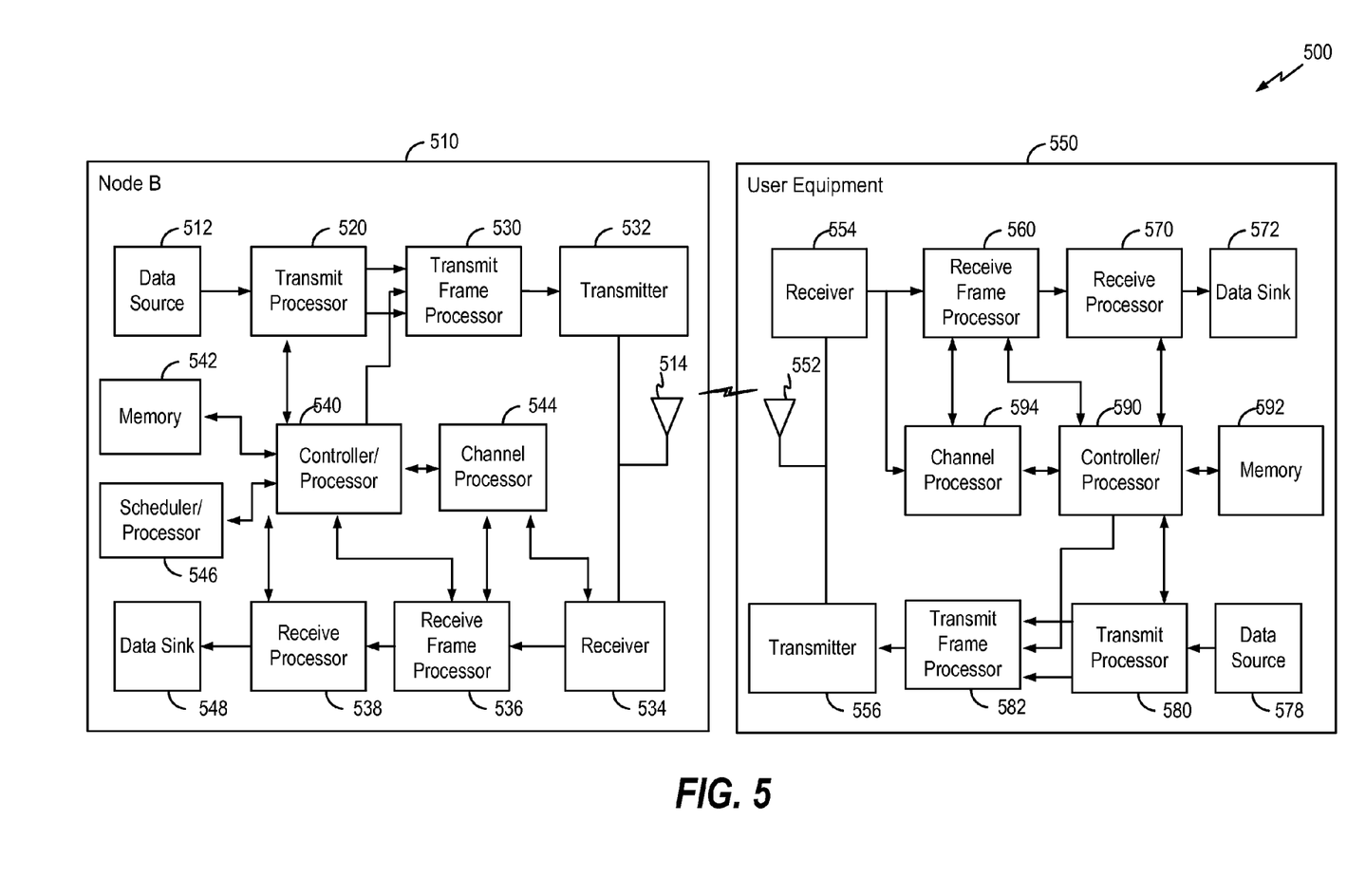
FIG. 5 is a block diagram conceptually illustrating an example of a User Equipment (UE) in which the SoC device of FIG. 1 may be implemented for communication with a Node B in a telecommunications system.

FIG. 5 is a block diagram of an exemplary UE 550 in communication with an exemplary Node B 510, where the UE 550 may include an SoC device such as the SoC device 100. In a downlink communication portion starting from the Node B 510, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 514. The antenna 514 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In an uplink communication portion starting from the UE 550, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 534 receives the uplink transmission through the antenna 514 and processes the transmission to recover the information modulated onto the carrier. The information recovered by the receiver 534 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 548 and the controller/processor 540, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

In one configuration, an apparatus such as the SoC device 100 for hybrid chip-level power management includes means for implementing a power profile for supplying power to a plurality of subsystems on a shared power bus, wherein the power profile includes at least one adjustable parameter for controlling the supplied power during an active use state. The apparatus also includes means for detecting a power profile change trigger; means for modifying the power profile based on the power profile change trigger; and means for adjusting the supplied power during the active use state based on the modified power profile to maintain a predetermined supplied power level. In one aspect of the disclosed approach, the aforementioned means may be implemented with the resource and power management processor 130 in collaboration with the CPR module 120, as illustrated in from FIG. 1 (described with reference to FIGS. 2 and 3) to be configured to perform the functions recited by the aforementioned means. In another aspect, the aforementioned means may be a module or any apparatus configured to perform the functions recited by the aforementioned means.

Figure 6:
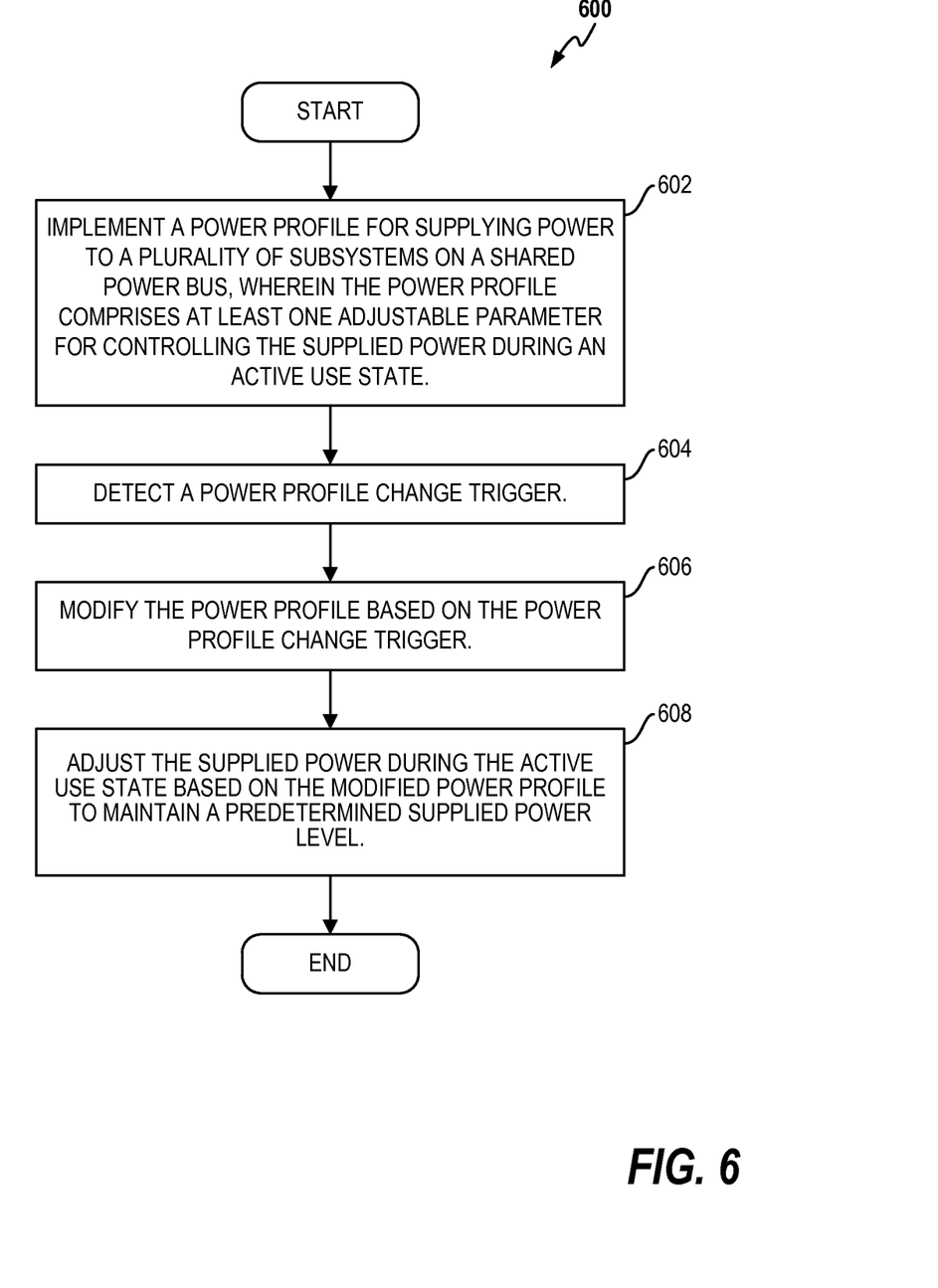
FIG. 6 is a flow diagram for a power management process for an SoC device such as the SoC device of FIG. 1.

FIG. 6 illustrates a method for power management of a system-on-a-chip (SoC). A power profile may be implemented for supplying power to a plurality of subsystems on a shared power bus, wherein the power profile includes at least one adjustable parameter for controlling the supplied power during an active use state 602. A power profile change trigger may then be monitored and/or detected 604. The power profile may be modified based on the power profile change trigger 606. The supplied power may be adjusted during the active use state based on the modified power profile to maintain a predetermined supplied power level 608. In one example, modifying the power profile may include adjusting the at least one adjustable parameter. The at least one adjustable parameter may include, for example, a voltage level, where the voltage level is a recommended voltage based on a performance level.

Implementing the power profile may include creating a set of power profiles, wherein each power profile includes an association with a performance level of at least one of the plurality of devices. Each power profile in the set of power profiles may include a safe voltage level including a voltage level at which every subsystem in the plurality of subsystems may operate. Modifying the power profile may include switching to another power profile from the power profile in the set of power profiles. The method may further include modifying, in the other power profile, an associated adjustable parameter for controlling the supplied power during another active use state before switching from the power profile to the other power profile. The at least one adjustable parameter may include an offset, and wherein modifying the associated adjustable parameter in the other power profile includes adjusting the associated adjustable parameter based on the offset. The offset includes a historical value of the at least one adjustable parameter.

In one example, detecting the power profile change trigger may include detecting an environmental change that affects the at least one adjustable parameter. The environmental change may include at least one variation in temperature, or IR-drop experienced in the SoC. The IR-drop may be based on changes in power demands by other active subsystems.

Detecting the power profile change trigger may include receiving a request to change the at least one adjustable parameter. In one example, the request may include an interrupt signal.

Detecting the power profile change trigger may include receiving a request to change the at least one adjustable parameter. The predetermined supplied power level may include a voltage level higher than an estimated operating voltage requirement for the plurality of subsystems on the shared power bus.

Several aspects of a power management system have been presented with reference to a method and apparatus for hybrid chip-level voltage scaling. As those skilled in the art will readily appreciate, various aspects described throughout this disclosure may be extended to other power management methods, apparatus, and systems.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosed approach described herein can be implemented in different systems without departing from the novel aspects of the disclosed approach. It should be noted that the foregoing embodiments are merely examples and are not to be construed as limiting the disclosed approach. The description of the embodiments is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for power management of a system-on-a-chip (SoC), comprising:
   selecting one of a plurality of power management approaches based on timing sensitivity or voltage sensitivity of one or more of a plurality of subsystems on a shared power bus, wherein the plurality of power management approaches includes at least two of the following: a conservative power management approach, an aggressive power management approach, and a tracking power management approach;
   determining an initial voltage level for a power supply based on the selected one of the power management approaches, the power supply supplying power to the shared power bus;
   setting a voltage of the power supply based on the initial voltage level;
   receiving a desired performance level signal from each of at least two of the plurality of subsystems;
   aggregating the desired performance level signals from the at least two of the plurality of subsystems;
   determining a final performance level based on the aggregating; and
   adjusting the voltage of the power supply to maintain the final performance level.

2. The method of claim 1, further comprising selecting one of a plurality of power profiles based on the final performance level, wherein determining the initial voltage level is also based on the selected one of the power profiles.

3. The method of claim 2, wherein the initial voltage level comprises a last voltage level used for the selected one of the power profiles if the aggressive power management approach is selected.

4. The method of claim 1, wherein the initial voltage level comprises a safe voltage level if the conservative power management approach is selected, and the safe voltage level is a voltage level higher than an estimated operating voltage requirement for the plurality of subsystems.

5. The method of claim 1, further comprising tracking variation of the voltage of the power supply with respect to a safe voltage level for the final performance level.

6. The method of claim 1, further comprising determining an offset voltage based on historical variation of the voltage of the power supply with respect to a safe voltage for a previous performance level, and adjusting a safe voltage level for the final performance level based on the determined offset voltage, wherein the initial voltage level comprises the adjusted safe voltage level if the tracking power management approach is selected.

7. The method of claim 1, further comprising detecting a voltage on the shared power bus, wherein adjusting the voltage of the power supply is based on the detected voltage.

8. The method of claim 1, further comprising detecting an environmental change that affects a voltage on the shared power bus, wherein adjusting the voltage of the power supply is based on the detected change.

9. The method of claim 8, wherein the environmental change comprises at least one of a variation in temperature, or IR-drop experienced in the SoC.

10. The method of claim 9, wherein the variation in IR-drop is based on changes in power demands by other active subsystems.

11. The method of claim 1, further comprising receiving a request to change the voltage of the power supply, and wherein adjusting the voltage of the power supply is performed in response to the request.

12. The method of claim 11, wherein the request comprises an interrupt signal.

13. The method of claim 11, wherein the request comprises a recommended change in the voltage of the power supply, and adjusting the voltage of the power supply is based on the recommended change.

14. A non-transitory processor-readable storage medium comprising instructions stored thereon, which when executed by a processor, causes the processor to:
   select one of a plurality of power management approaches based on timing sensitivity or voltage sensitivity of one or more of a plurality of subsystems on a shared power bus, wherein the plurality of power management approaches includes at least two of the following: a conservative power management approach, an aggressive power management approach, and a tracking power management approach;
   determine an initial voltage level for a power supply based on the selected one of the power management approaches, the power supply supplying power to the shared power bus;
   set a voltage of the power supply based on the initial voltage level;
   receive a desired performance level signal from each of at least two of the plurality of subsystems;
   aggregate the desired performance level signals from the at least two of the plurality of subsystems;
   determine a final performance level based on the aggregate; and
   adjust the voltage of the power supply to maintain the final performance level.

15. The non-transitory processor-readable storage medium of claim 14, further comprising instructions, which when executed by the processor, cause the processor to select one of a plurality of power profiles based on the final performance level, wherein the instructions that cause the processor to determine the initial voltage level comprise instructions, which when executed by the processor, cause the processor to determine the initial voltage level based also on the selected one of the power profiles.

16. The non-transitory processor-readable storage medium of claim 15, wherein the initial voltage level comprises a last voltage level used for the selected one of the power profiles if the aggressive power management approach is selected.

17. The non-transitory processor-readable storage medium of claim 14, wherein the initial voltage level comprises a safe voltage level if the conservative power management approach is selected, and the safe voltage level is a voltage level higher than an estimated operating voltage requirement for the plurality of subsystems.

18. The non-transitory processor-readable storage medium of claim 14, further comprising instructions, which when executed by the processor, cause the processor to determine an offset voltage based on historical variation of the voltage of the power supply with respect to a safe voltage for a previous performance level, and adjust a safe voltage level for the final performance level based on the determined offset voltage, wherein the initial voltage level comprises the adjusted safe voltage level if the tracking power management approach is selected.

19. The non-transitory processor-readable storage medium of claim 14, further comprising instructions, which when executed by the processor, cause the processor to detect a voltage on the shared power bus, and wherein the instructions that causes the processor to adjust the voltage comprises instructions, which when executed by the processor, cause the processor to adjust the voltage of the power supply based on the detected voltage.

20. An apparatus for power management, comprising:
at least one processor; and
a memory coupled to the at least one processor, wherein the memory is configured to cause the at least one processor to:
  select one of a plurality of power management approaches based on timing sensitivity or voltage sensitivity of one or more of a plurality of subsystems on a shared power bus, wherein the plurality of power management approaches includes at least two of the following: a conservative power management approach, an aggressive power management approach, and a tracking power management approach;
  determine an initial voltage level for a power supply based on the selected one of the power management approaches, the power supply supplying power to the shared power bus;
  set a voltage of the power supply based on the initial voltage level;
  receive a desired performance level signal from each of at least two of the plurality of subsystems;
  aggregate the desired performance level signals from the at least two of the plurality of subsystems;
  determine a final performance level based on the aggregate; and
  adjust the voltage of the power supply to maintain the final performance level.

21. The apparatus of claim 20, wherein the memory is further configured to cause the at least one processor to select one of a plurality of power profiles based on the final performance level, and determine the initial voltage level based also on the selected one of the power profiles.

22. The apparatus of claim 21, wherein the initial voltage level comprises a last voltage level used for the selected one of the power profiles if the aggressive power management approach is selected.

23. The apparatus of claim 20, wherein the initial voltage level comprises a safe voltage level if the conservative power management approach is selected, and the safe voltage level is a voltage level higher than an estimated operating voltage requirement for the plurality of subsystems.

24. The apparatus of claim 20, wherein the memory is further configured to cause the at least one processor to determine an offset voltage based on historical variation of the voltage of the power supply with respect to a safe voltage for a previous performance level, and adjust a safe voltage level for the final performance level based on the determined offset voltage, wherein the initial voltage level comprises the adjusted safe voltage level if the tracking power management approach is selected.

25. The apparatus of claim 20, wherein the memory is further configured to cause the at least one processor to detect a voltage on the shared power bus and adjust the voltage of the power supply based on the detected voltage.

* * * * *